Figure 1:
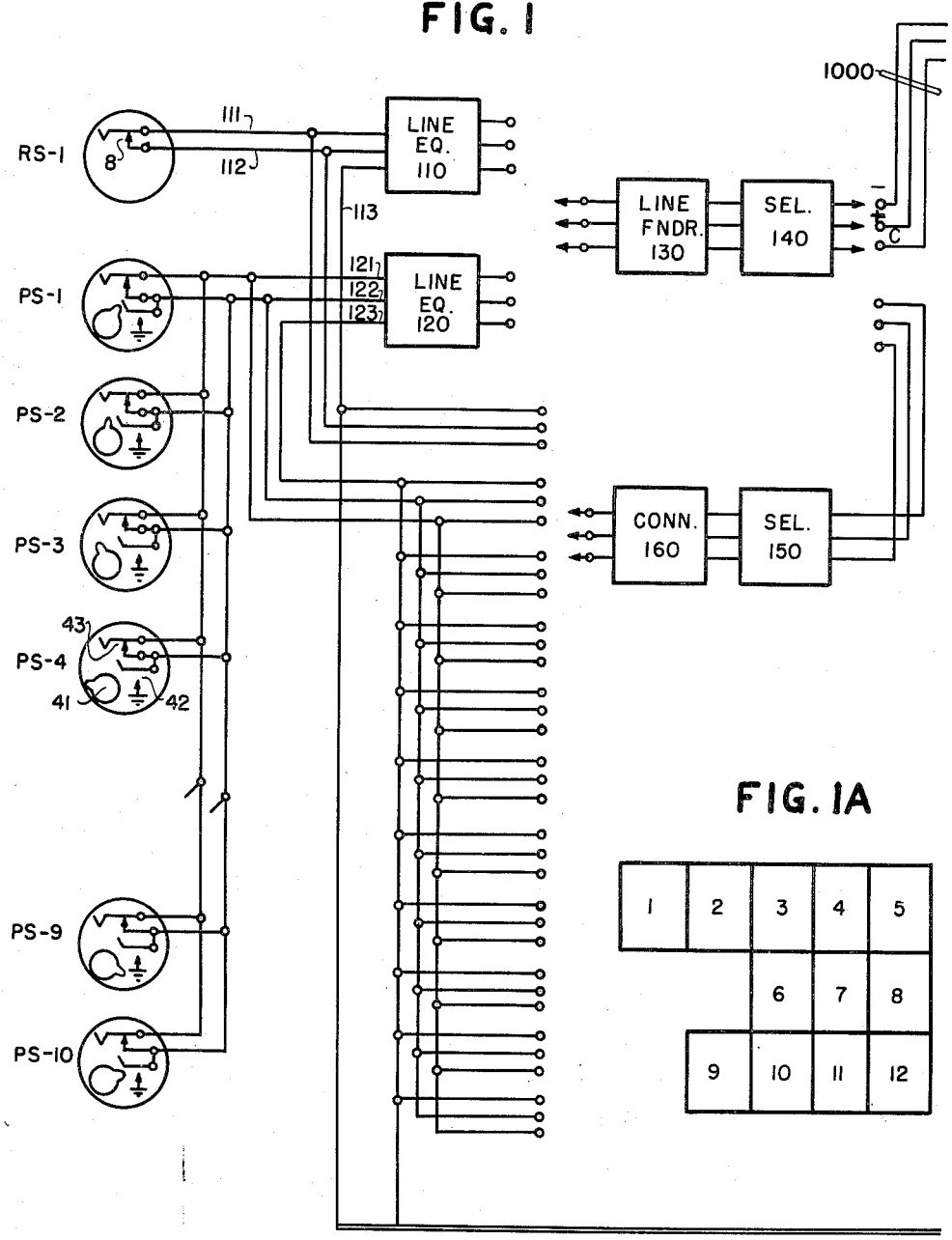

March 6, 1962  J. E. OSTLINE  3,024,316
CALLING LINE AND STATION IDENTIFICATION SYSTEM
Filed Dec. 3, 1956  12 Sheets-Sheet 1

INVENTOR.
JOHN E. OSTLINE
BY
ATTY.

INVENTOR.
JOHN E. OSTLINE

INVENTOR.
JOHN E. OSTLINE

INVENTOR.
JOHN E. OSTLINE

March 6, 1962 J. E. OSTLINE 3,024,316
CALLING LINE AND STATION IDENTIFICATION SYSTEM
Filed Dec. 3, 1956 12 Sheets-Sheet 6

INVENTOR.
JOHN E. OSTLINE
BY
ATTY.

INVENTOR.
JOHN E. OSTLINE

INVENTOR.
JOHN E. OSTLINE

INVENTOR.
JOHN E. OSTLINE

March 6, 1962 J. E. OSTLINE 3,024,316
CALLING LINE AND STATION IDENTIFICATION SYSTEM
Filed Dec. 3, 1956 12 Sheets-Sheet 12

INVENTOR.
JOHN E. OSTLINE
BY
*C. A. Gulbrandsen*
ATTY.

United States Patent Office 3,024,316
Patented Mar. 6, 1962

3,024,316
CALLING LINE AND STATION IDENTIFICATION SYSTEM
John E. Ostline, Chicago, Ill., assignor to Automatic Electric Laboratories, Inc., a corporation of Delaware
Filed Dec. 3, 1956, Ser. No. 625,833
8 Claims. (Cl. 179—18)

The present system relates to automatic toll ticketing telephone systems and more particularly to line and party detecting apparatus. More specifically the present invention relates to line and party detecting apparatus adapted to be incorporated in an automatic recording telephone system of the character of that disclosed in the copending application of J. E. Ostline, I. V. Coleman and J. W. Taugner, Serial No. 628,474, filed Dec. 3, 1956. In an automatic toll ticketing telephone system the detector is that unit of equipment which automatically detects the directory number of a subscriber station, when that station dials a toll call. This number becomes part of a call record which is automatically recorded at the termination of each completed customer dialled toll call. Earlier type detectors in present use are arranged to detect individual line station and party line station directory numbers when there are up to a maximum of five stations per line. These earlier detectors were further limited in that though they were capable of detecting party line stations that were arranged for terminal per station service, these stations had to utilize the frequency per hundred group method of operation. The terminal per station and frequency per hundred terminals group method of providing party station service in automatic exchanges is well-known and widely used. However, in many exchanges it becomes somewhat inflexible when party station subscribers move within an exchange area. Because in order to conserve outside plant facilities it often becomes necessary to change directory listed station numbers. This inflexibility increases information equipment and operator requirements and also restricts maintenance of balanced connector loads. In order to maintain efficient distribution of connector traffic in an exchange and especially to be able to economically maintain existing directory listings when party service subscribers move within an exchange area, a terminal per station party service plan with frequency-per-terminal ringing is now rapidly coming to the fore for new exchange installations. This party station service by means of the frequency per terminal method permits each terminal number to be treated individually because any terminal number in an exchange may be associated with any party or frequency group. Under this method the significance of a party hundred terminal group in a detection process is absent and facilities must be provided so that any individual terminal can be associated with or jumpered to any party or frequency group.

It is accordingly an object of this invention to provide a detector that can service exchanges arranged for terminal and frequency per station service.

It is another object of this invention to identify calling stations on party lines having up to ten parties per line.

It is another object of this invention to provide an arrangement for identifying the calling party on a party line by rendering conductive a gas tube individual to that party station.

It is a further object of the invention to provide a detector comprising a gas filled discharge device of the two element type individual to each station of each line of the telephone system and a plurality of setable registers which are controlled in response to the conductivity of any one of the devices to register a multi-digit designation corresponding to the directory number of the identified calling station.

Another object of the invention is to provide in an automatic telephone system, including party lines having up to ten parties per line, an improved arrangement for identifying the directory number of the calling station on the calling party line, which is selectively governed by the calling devices at the various calling party substations to render effective only those gas filled discharge devices which are individual to the corresponding station on each of the party lines in the telephone system.

A further object of the invention is to provide, in an automatic telephone system including party lines which are arranged on a terminal per station and frequency per terminal basis, an improved detector provided with a gas filled discharge device for each substation on each of the party lines of the system and which is operated incident to the extension of the connection from the given station on a given party line to render effective only the gas filled discharge device individual to that station thereby to identify only the given station on the given party line as a calling station.

Further objects and features of the invention pertain to the particular arrangement of the circuit elements of the system whereby the above outlined objects and additional operating features are attained. The invention both as to its organization and method of operation together with further objects and advantages thereof will be best understood by reference to the following specification taken in connection with the accompanying drawings in which FIGS. 1–12 inclusive, illustrate the apparatus incorporated in an exchange of the telephone system, which apparatus has incorporated therein the features of the invention as briefly outlined above. Fig. 1A illustrates the mode of combining FIGS. 1–12 inclusive to form a unified system. More particularly FIG. 1 illustrates schematically a major portion of the apparatus incorporated in a telephone exchange. FIGS. 2 to 5 illustrate the cooperating portion of the ticketer while FIGS. 6 to 12 illustrate the details of the improved detector provided in a telephone exchange.

An automatic toll ticketing telephone system serves a large metropolitan area and adjacent suburban areas which are divided into a number of offices, each of which includes one or more exchanges. Each exchange in each office comprises a ten thousand terminal unit although it may not be initially installed to serve its ulitimate capacity. Each exchange terminates subscribers lines connected to subscriber stations that are identified by four numerical digits. Consequently any subscriber station in any exchange in any national toll area may be identified by the usual directory number comprising a code portion including three digits representing respectively the first two letters of the office name and a digit representing the number of the exchange in the office and a numerical portion including four digits identifying a terminal of a particular station. It is to be noted that the directory numbers of the party subscriber substation require no suffix digit, in view of the fact that all of the party lines are arranged on a terminal per station basis and consequently each of the stations on each of the party lines is provided with an individual four digit number identifying the particular terminal of the party station.

*General Arrangement of the Telephone System*

The telephone exchange of FIG. 1 comprises automatic switching apparatus serving a maximum of 10,000 terminals, one of the terminals terminating the line of the regular subscriber substation RS–1 and ten of the terminals commonly terminating the line of the ten party subscriber substations PS–1, PS–2 and PS–3 to PS–10. The switching equipment comprises a number of line circuits individually associated with the subscriber lines terminating in the exchange. For example, the line circuit 110 terminates the line of the regular subscriber substation RS–1 and the line circuit 120 terminates the line of the party line subscriber substations PS–1 to PS–10. The subscribers are rendered free automatic local service within their own exchange and the exchanges of their metropolitan area but are automatically ticketed for the toll charges to all exchanges outside their area.

The switching equipment of the exchange also comprises a group of finder switches, including the finder switch 130 which has access to the line circuits 110 and 120. Each of the finders is individually associated with a primary selector, such as the primary selector 140. The primary selectors have access through their banks to the local switch train including the second selector 150 and the connector 160, and for toll calls to the ticketer, part of which is shown in FIGS. 2 to 5, and its associated equipment which is not shown. The various selectors and connectors are of conventional construction and operation.

Figure 2:
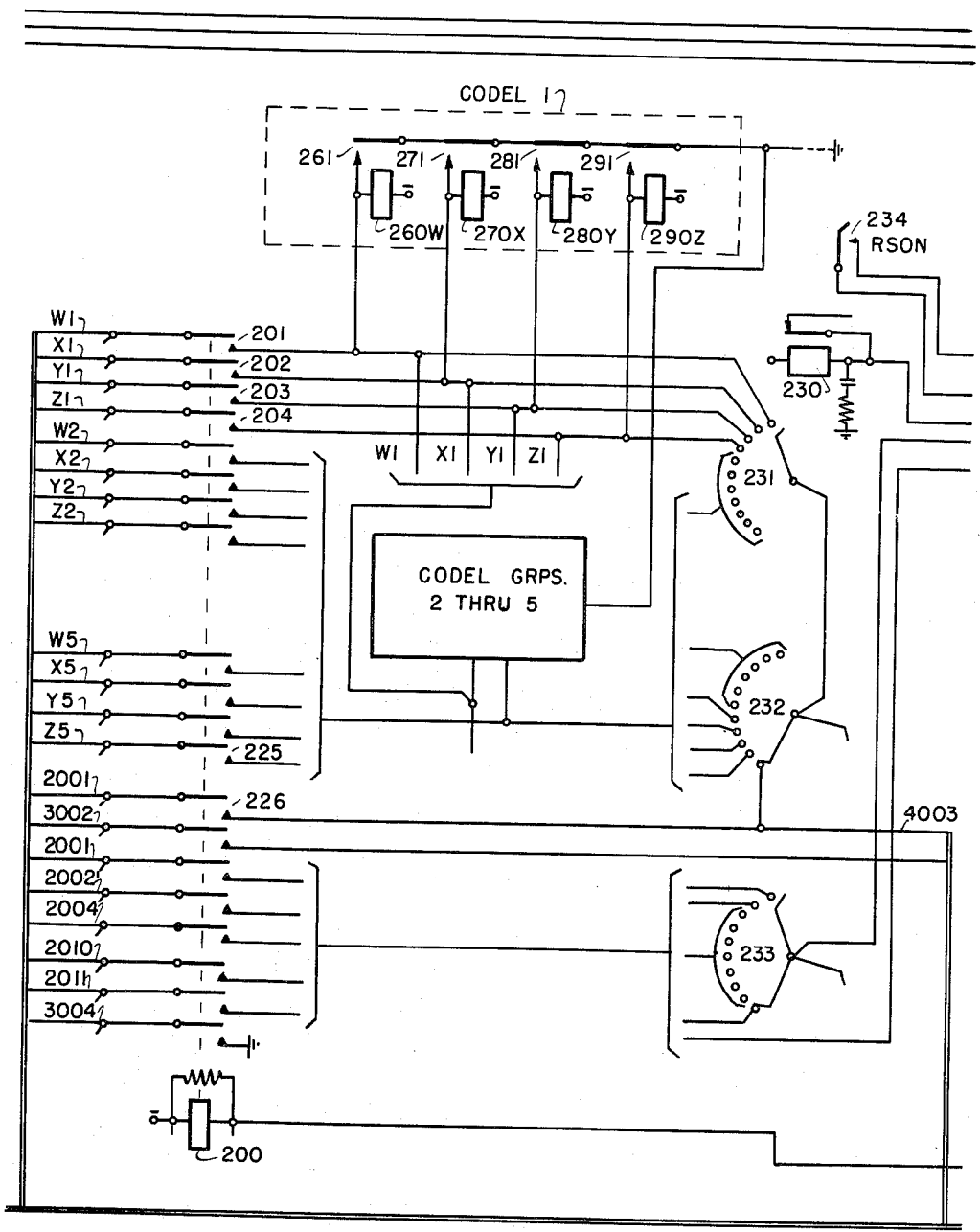
Figure 3:
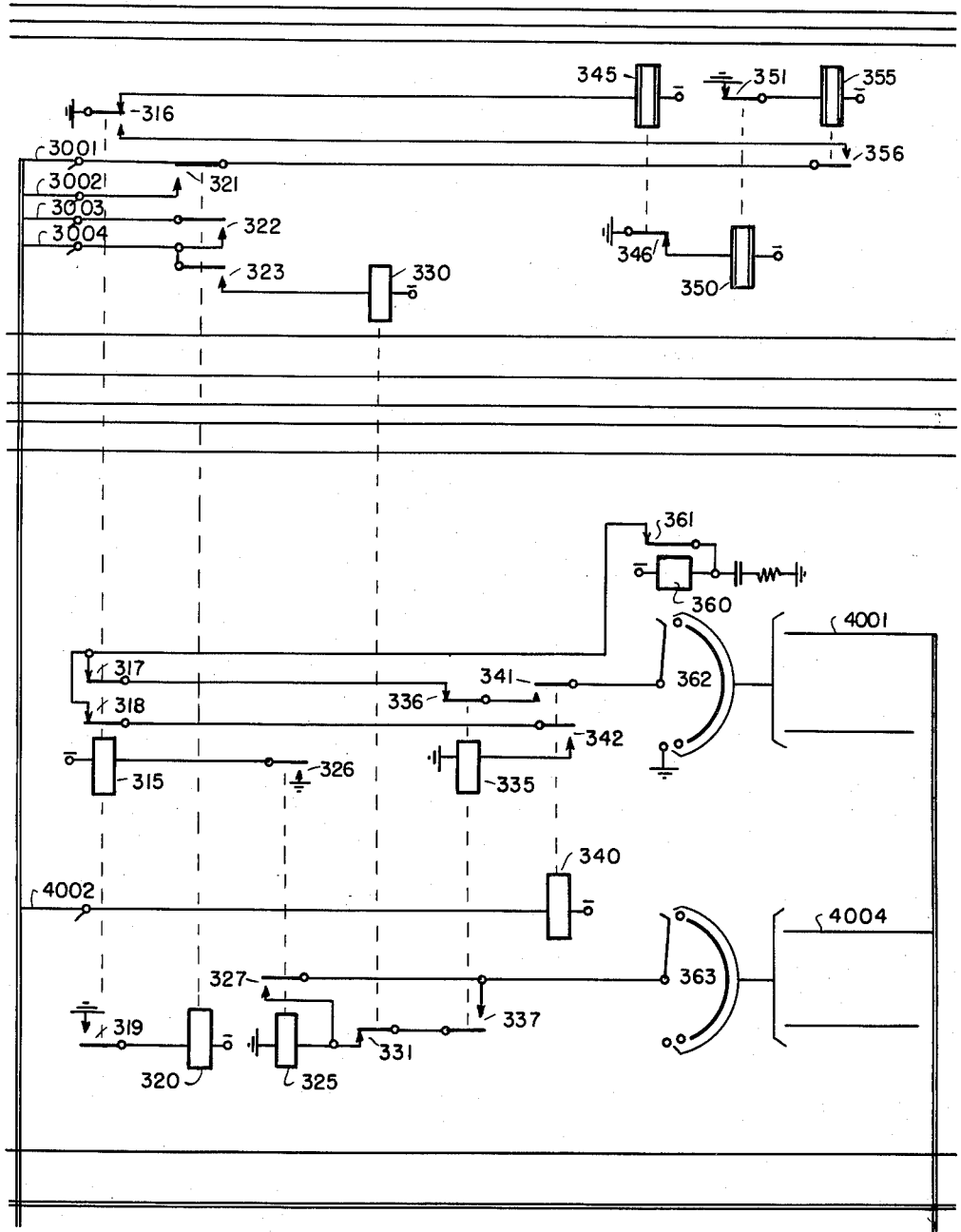

In considering the detector shown in FIGS. 6 to 12 inclusive, it is noted that it is connected to each of the connector bank terminals of each of the subscriber lines terminating in the exchange, and that it is associated with each of a plurality of ticketers in an exchange, such as the ticketer shown in FIGS. 2 to 5 through a detector assigner as shown in FIG. 3.

Each subscriber substation is provided with the usual substation apparatus, including a telephone instrument, a ringer and a calling device or dial. The calling devices disposed at the regular subscriber substations such as the substation RS–1 are of conventional construction and arrangement. The calling devices disposed at the party subscriber substations, such as PS–1, PS–2, etc. are of special construction and arrangement as disclosed in the patent application of John E. Ostline, Serial No. 472,713, filed December 2, 1954 now Patent Number 2,822,424. The special dials of the type disclosed in the aforesaid patent, in addition to the set of impulse springs, are provided with a set of cam springs which are utilized to identify the position of the calling subscriber substation on the associated party line whereby one ground pulse is transmitted from the calling device during the closed period of the impulse springs after the pulse corresponding to the party's position on the line.

Figure 6:
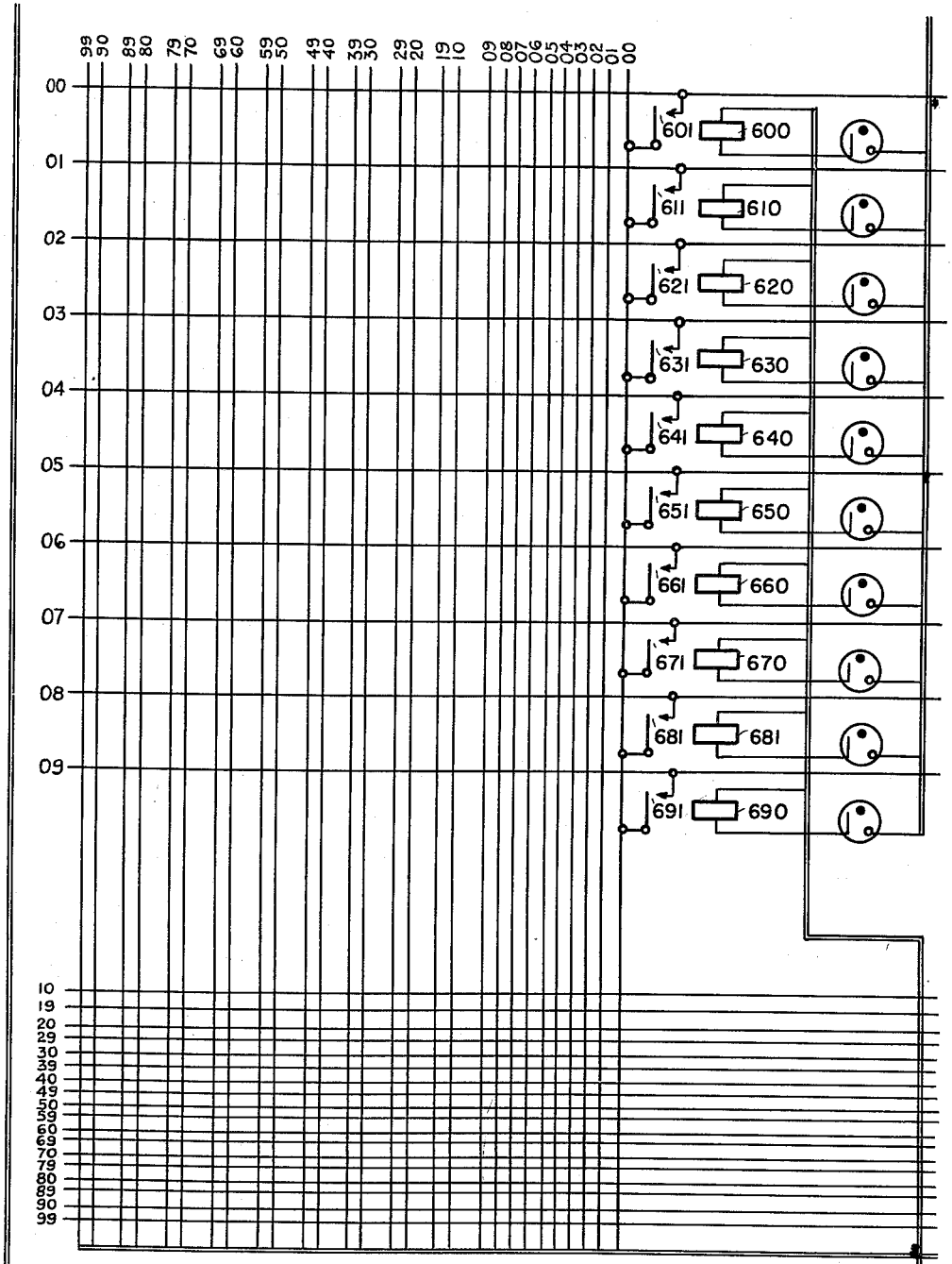
Figure 7:
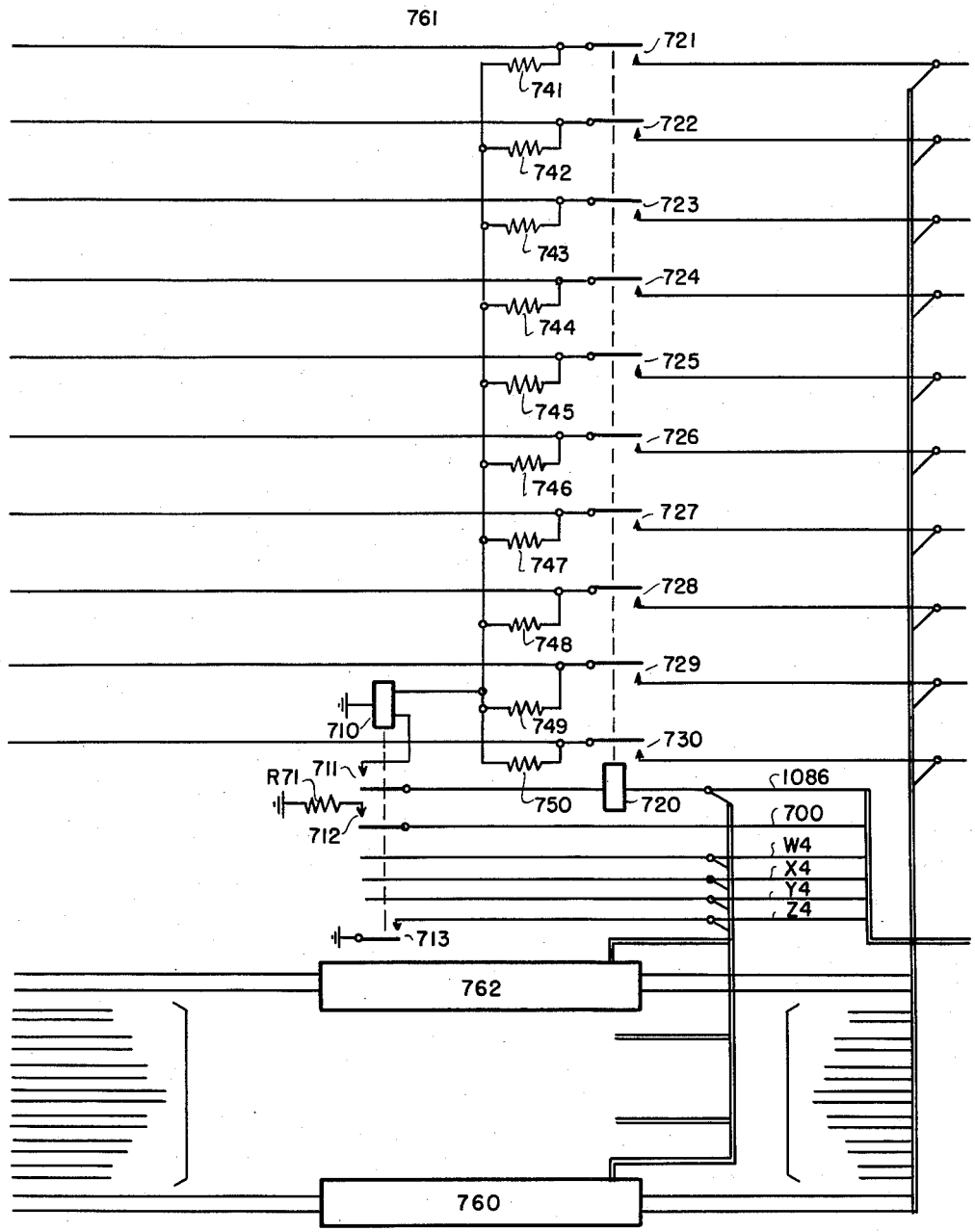
Figure 8:
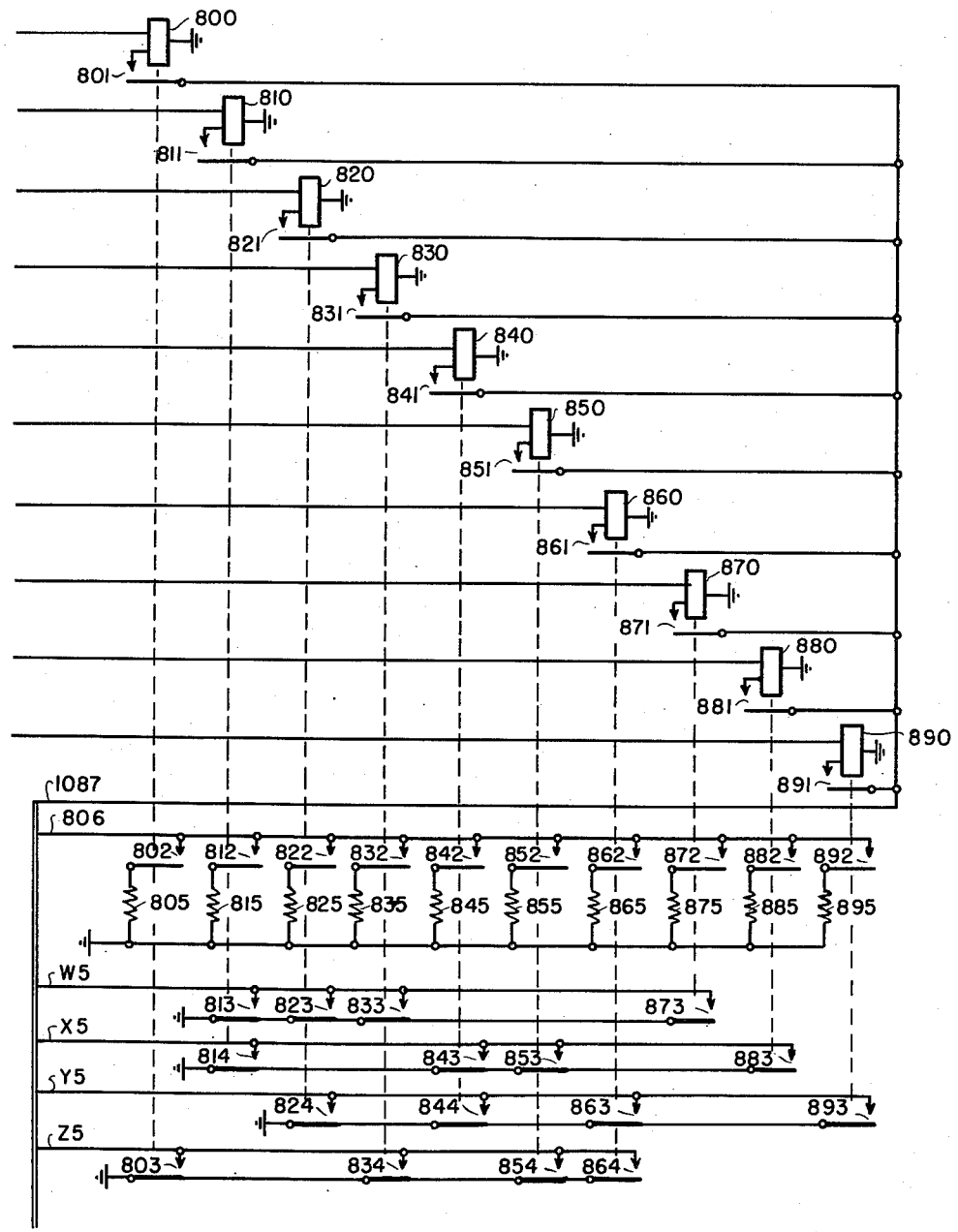
Figure 9:
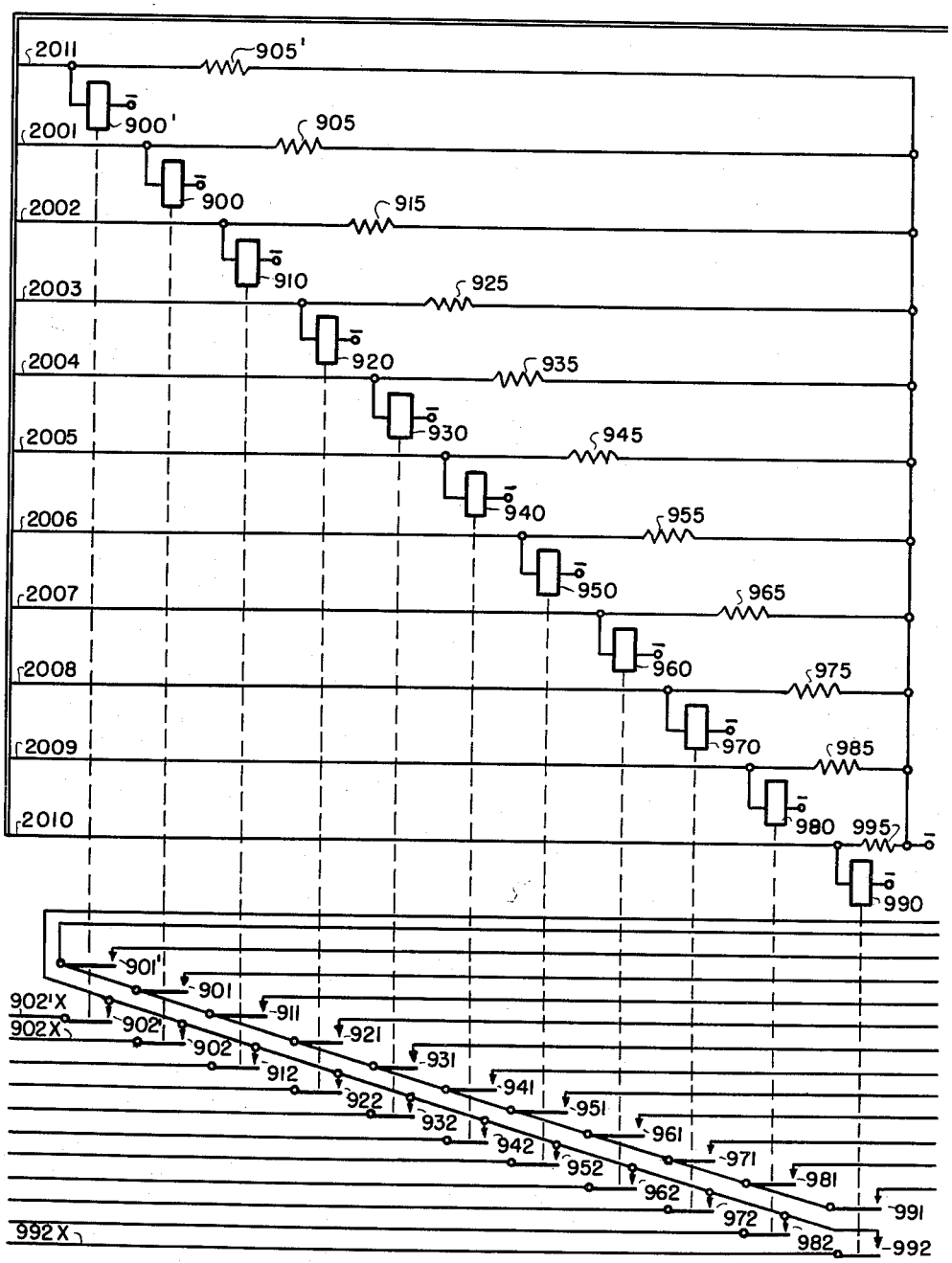
Figure 10:
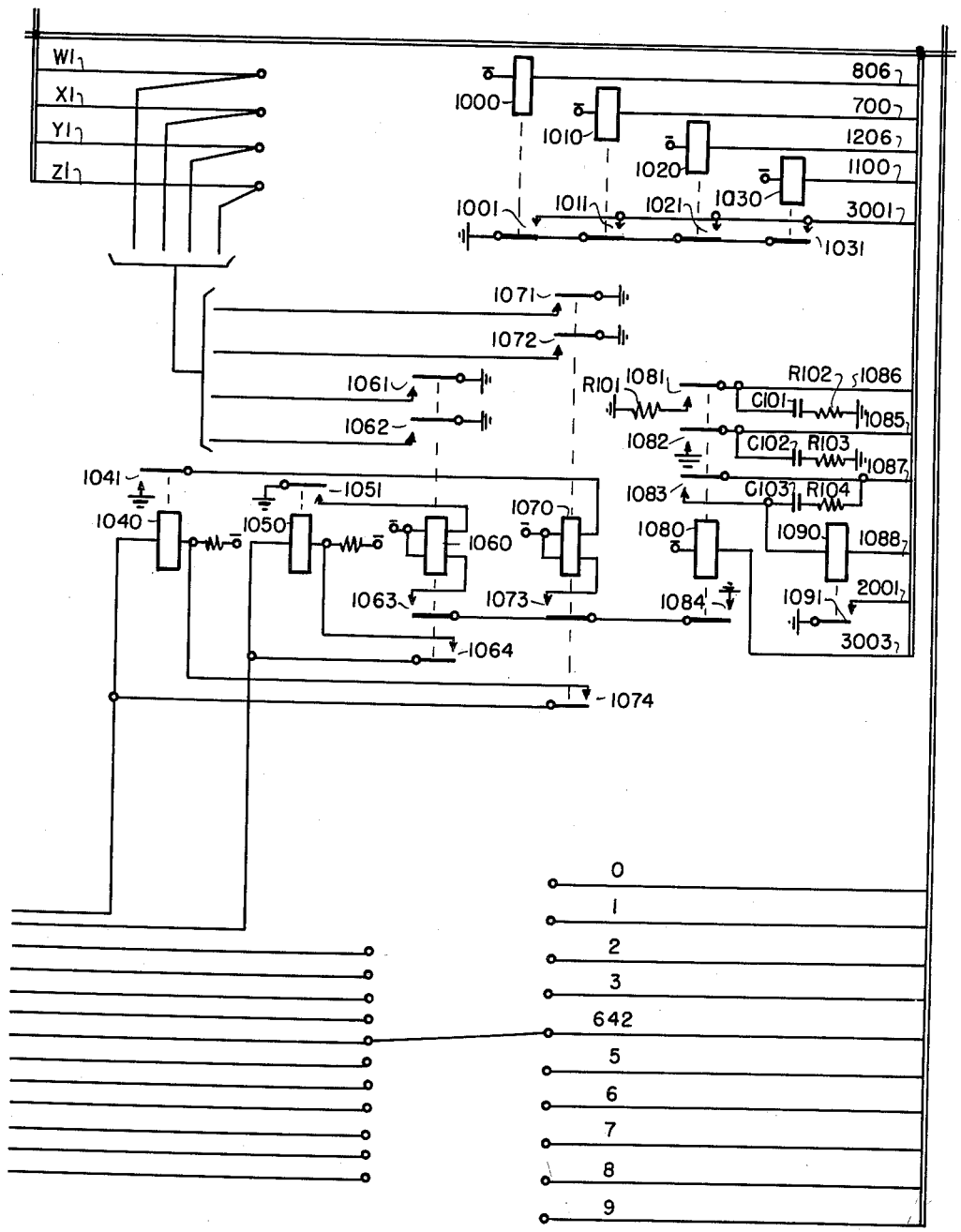
Figure 11:
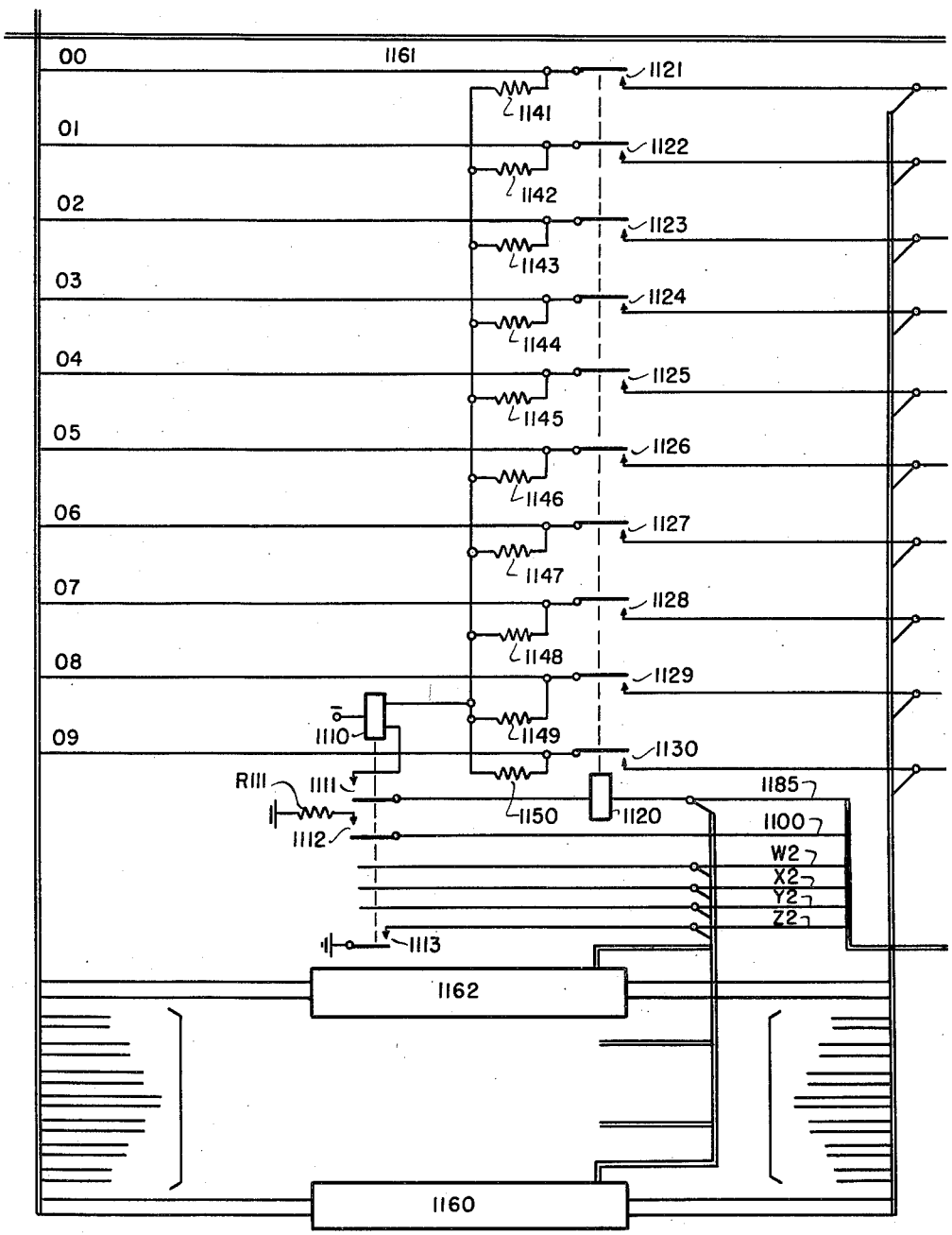
Figure 12:
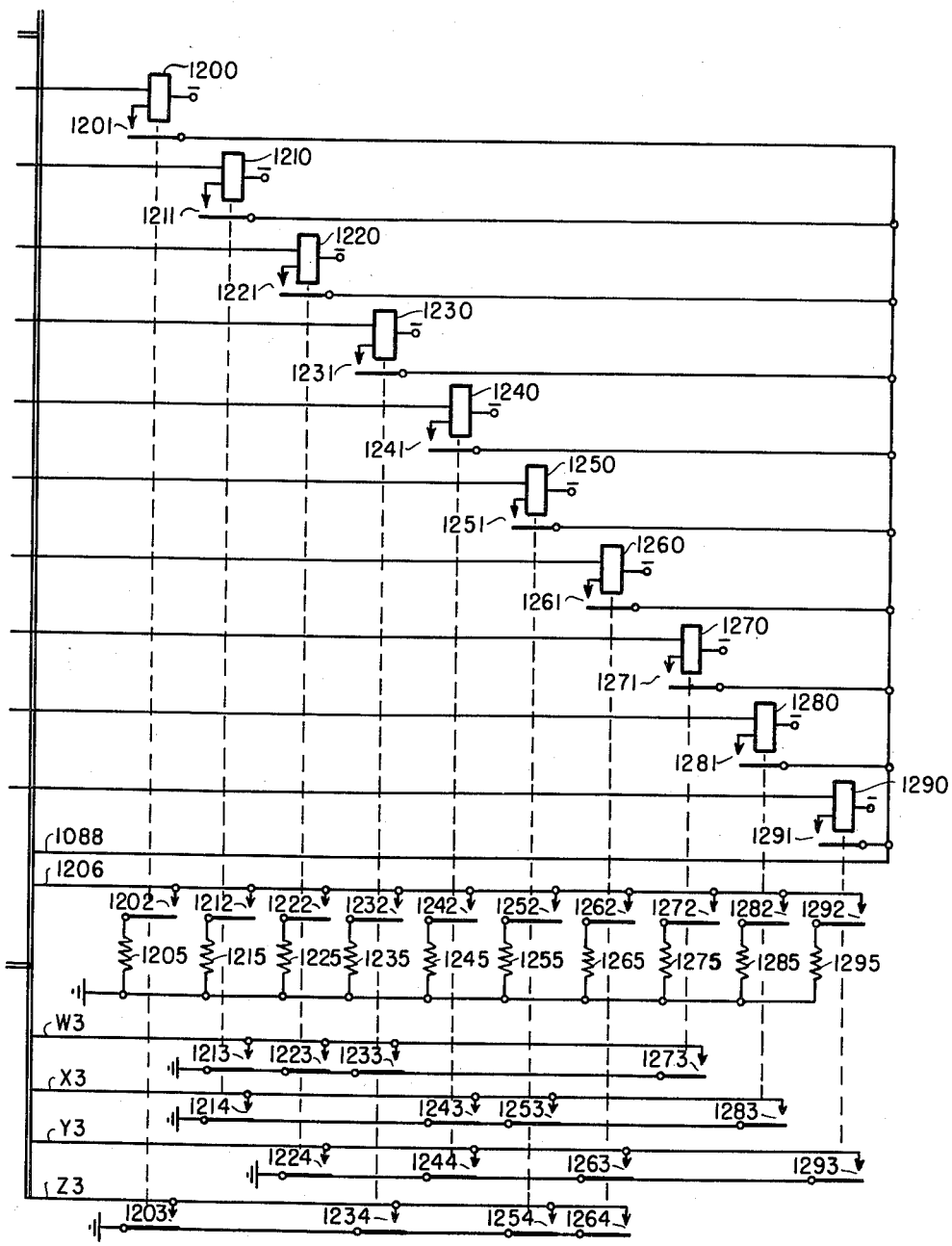

The detector has access to 10,000 terminals in the connector banks of the local switch train and comprises, as is partially shown in FIG. 6 a group of 10,000 detrel relays, such as detrel relays 600, 610, 620, etc. One of these detrel relays is associated with each subscriber substation in the exchange, and is so positioned in a circuit that its single pair of make contacts can complete one of 10,000 points of contact in a coordinate grid composed of 100 horizontal conductors and 100 vertical conductors. Each of these conductors in each group has a two digit designation from 00 to 99. The detrel relay in operating would complete the connection from one of the horizontal conductors with a designation corresponding to the tens and units digits of the calling party's directory number to a vertical conductor with a designa- corresponding to the thousands and hundreds digits of the subscriber's directory number. For identifying the horizontal and vertical conductors of the grid that have been connected together, there is an identifying circuit corresponding to each one of the four digits of the directory number. The horizontal conductors of the grid are divided into ten groups of ten conductors each, where each of the ten conductors in the group has a common tens digit designation. Each of the ten conductors of a group is wired through a resistor to a tens detecting relay, such as relay 710, which upon operating places a code marking corresponding to its groups designation upon a group of conductors, while its slave relay, such as relay 720, extends the ten conductors to a succeeding circuit which determines the identifying units digit of the conductor involved. This succeeding circuit is comprised of ten relays, such as relays 800, 810, etc., each of these relays is wired to one of the ten extended conductors of the group. The relay connected to the coordinate grid conductor involved in the connection operates to place a code marking corresponding to its unit designation upon another group of conductors.

The vertical conductors of the grid are connected to corresponding groups of relays, which detect the thousands and hundreds digits of the conductor involved in the connection at the detral relay. For detecting the thousands digit the vertical conductors are grouped into groups of ten conductors with a common thousands digit and through a resistor, such as 1141, 1142 etc. are connected to a relay such as 1110 for the group having the common thousands digit "0." Similarly to the tens digit detection group 761, the thousands digit detection group 1161 extends the ten conductors to ten relays such as 1200, 1210, etc. which determine the hundreds digit marking of the conductor.

All of the vertical conductors in the coordinate grid have negative potential in series with a resistor and relay at all times, and the horizontal conductors have positive potential in series with a resistor and relay at all times, so that almost simultaneously with the completion of a connection by the detrel relay between a horizontal and vertical conductor the detection is completed and the four digits of the directory number of the calling subscriber substation are marked upon four groups of conductors for registration in the ticketer. A fifth digit is marked upon a fifth group of conductors to indicate the ten thousands group indicative of this detector by the common control relays of the detector shown in FIG. 10.

*General Operation of the Telephone System*

Considering now the general operation of the telephone system, it is noted that when a metropolitan toll call is extended from one of the regular subscriber substations or one of the party subscriber substations in the exchange to a called exchange in another zone, the toll ticketing apparatus included in this exchange will cause a ticket tape punch machine to produce a perforated tape containing various items of information pertaining to the call. The items of information contained on the tape includes the calling subscriber directory number comprising three digits indicative of the calling office and exchange and four digits indicative of the calling subscriber connector bank terminal number. In addition to the foregoing, the tape includes the directory number of the called subscriber substation, the rate applicable to the call, the time duration of the call, the class of the calling line, the month and day that the call was established and perhaps the hour and minute that the call was completed. These perforated tapes may at the end of a billing period, be used to control a printing mechanism which will print individual tickets corresponding to the various items of information perforated on the ticket tape and which printing mechanism will automatically operate in accordance with certain of the items of information to calculate the cost of the call and print the established cost on the associated ticket.

The identification of the directory number or the connector bank terminal number of the calling regular subscriber substation or the calling party line subscriber substation in the exchange is performed by the detector, as explained more fully below.

Assuming that a metropolitan toll call is initiated at the calling regular subscriber substation RS–1, whose connector bank terminal number is 0100, and is to be extended to a called subscriber substation in an exchange in another area, the call is initiated when the subscriber removes his receiver from the switch-hook of the associated telephone instrument. This operation completes a loop circuit over the line conductors 111 and 112 whereupon the line circuit 110 individual to the calling subscriber operates in the usual manner to cause an idle finder, such as 130, to connect to the line. The primary selector 140 individually associated with the finder 130 returns a dial tone signal to the calling subscriber to indicate that he is to start dialling. The subscriber will then dial the toll access digit "9" to cause the selector to raise its wipers to the ninth level and search for an idle trunk to a ticketer such as trunk 1000.

When connected to a ticketer, a circuit will be completed from battery through relay 550 to the subscriber substation and back through relay 490 to spotter battery B51. Upon dialling the second digit "0" of the toll access code, relay 490 will follow the pulses and cause rotary switch 230 to step its wipers one step for each pulse. If the calling party were on a party line a ground pulse would be sent during the closed interval following the interruption corresponding to the party's position on the line. This pulse would cause relay 550 to operate. Relay 550 would then complete the circuit to relay 570 which would open the circuit to rotary switch stepping magnet 230 and also place a ground upon wiper 233 which is resting on a contact corresponding to the party line substation's position on the line. The remaning pulses would be followed by relay 490, but switch 230 would not follow. Upon completion of the sending of the pulses of the digit "0" relay 560 will fall back. Relay 470 operates to call for a detector by placing a ground marking on the start lead. This ground potential on the start lead operates relay 340 to cause rotary switch 360 to connect this ticketer to the detector circuit. However since station RS-1 was not a party line station relay 550 will not operate and switch 230 will step its wipers to the tenth rotary step in response to the dialling of the digit "0" into the ticketer. Relay 570 will not operate so that the ground marking on the break spring 571 will mark this calling substation as an individual line station to the detector.

The ticketer when it is assigned to the detector will operate its relay 410 thereby causing relay 480 to extend detection battery via the control lead through the selector, line finder and line equipment to the lines associated detrel relays such as relays 600 to 690, and relay 200 to extend the party marking to the two element gas tubes corresponding to the party's position on the line. From this it is evident that one of the detrel relays in the detector will operate. This relay will correspond to the directory number of the calling party's substation.

Upon operating, this relay will complete a connection between one lead in each of the two groups of conductors, one lead in the vertical group whose designation corresponds to the thousands and hundreds character of calling line's directory number and one lead in the horizontal group whose designation corresponds to the tens and units digits of the calling line's directory number. These leads and their designations are then detected by similar circuits associated with each group of leads.

The circuit for detecting the directory number or designation of the horizontal lead involved in a cross connection is comprised of ten relays each connected to ten of the one hundred horizontal leads to detect the tens designation and ten relays for detecting the units designation. The vertical leads have a similar group of circuits.

When the detection is complete there are five groups of four conductors each, termed the WXYZ leads, which have marked upon them by the absence or presence of ground potential the last five digits of the calling party's directory number. The first of the five characters being the designation of the ten thousand line group in which the party was located and is marked by the detector relay 1060 if in the first ten thousand group or 1070 if in the second ten thousand group. These markings on the WXYZ leads are registered in the ticketer on codel relays such as relays 260, 270, 280 and 290 of codel group one. Also detector relay 1090 completes a circuit to relay 415 which initiates the release of the detector from the ticketer, so that it may serve other ticketers while this ticketer performs other functions in the completion of the toll call.

*Detailed Operation*

When the calling subscriber at station PS-4 (whose directory number is 0004) removes his receiver, the usual loop circuit, including the line conductors 121 and 122 is completed for operating the line circuit 120. In response to the completion of the above mentioned loop circuit, the line circuit 120 initiates operation of the distributor and marks the terminals of the calling subscriber line in the bank contacts of a group of line finders, including the line finder 130, having access to the calling subscriber line. For the purpose of this description it will be assumed that the distributor selects the line finder 130 and that the latter finder operates its wipers in a vertical and then in a rotary direction in the well-known manner to select the terminals in the associated bank terminating the calling line. When the calling line is found by the line finder 130, it extends the calling line to the individually associated first selector 140 and the latter selector transmits the usual dial tone signal to the calling subscriber to indicate that the dialling may be started. The above noted switching apparatus, including the line circuit 120, the distributor, the line finder 130 and the first selector 140 may be of conventional construction and arrangement and may be, for example, of the type illustrated in the Bakker Patent No. 2,289,896, granted July 14, 1942, and in the Saunders Patent No. 1,849,694, granted March 15, 1932.

Since the calling subscriber at station 0004 intends to extend the connection to a called subscriber in a remote exchange it is necessary to prefix the directory number of the called subscriber with the toll access digits "90." When the calling subscriber receives the dialling tone signal the dial is actuated in accordance with the digit "9" to transmit nine loop impulses to the first selector 140. This selector then raises its wipers in a vertical direction to the ninth level and then rotates its wipers over the selected level to search for an idle ticketer, such as the ticketer of FIGS. 2 to 5. It will be assumed for the purpose of this description that the first selector 140 now extends the connection from the calling subscriber line by way of the cable 1000 to the ticketer illustrated in FIGS. 2 to 5, inclusive. The cable 1000 includes "—" conductor, the "+" conductor and the "C" control conductor. If the ticketer is busy, the control conductor will be grounded in order to indicate the busy condition to the first selector 140. Thus, as the selector rotates its wipers over the ninth level it will pass over contacts terminating ticketers having grounded control conductors corresponding to the C conductor. When the first selector 140 seizes the ticketer it extends the loop circuit, including the "—" and "+" conductors of the calling line to the "—" and "+" conductors of the ticketer.

Figure 4:
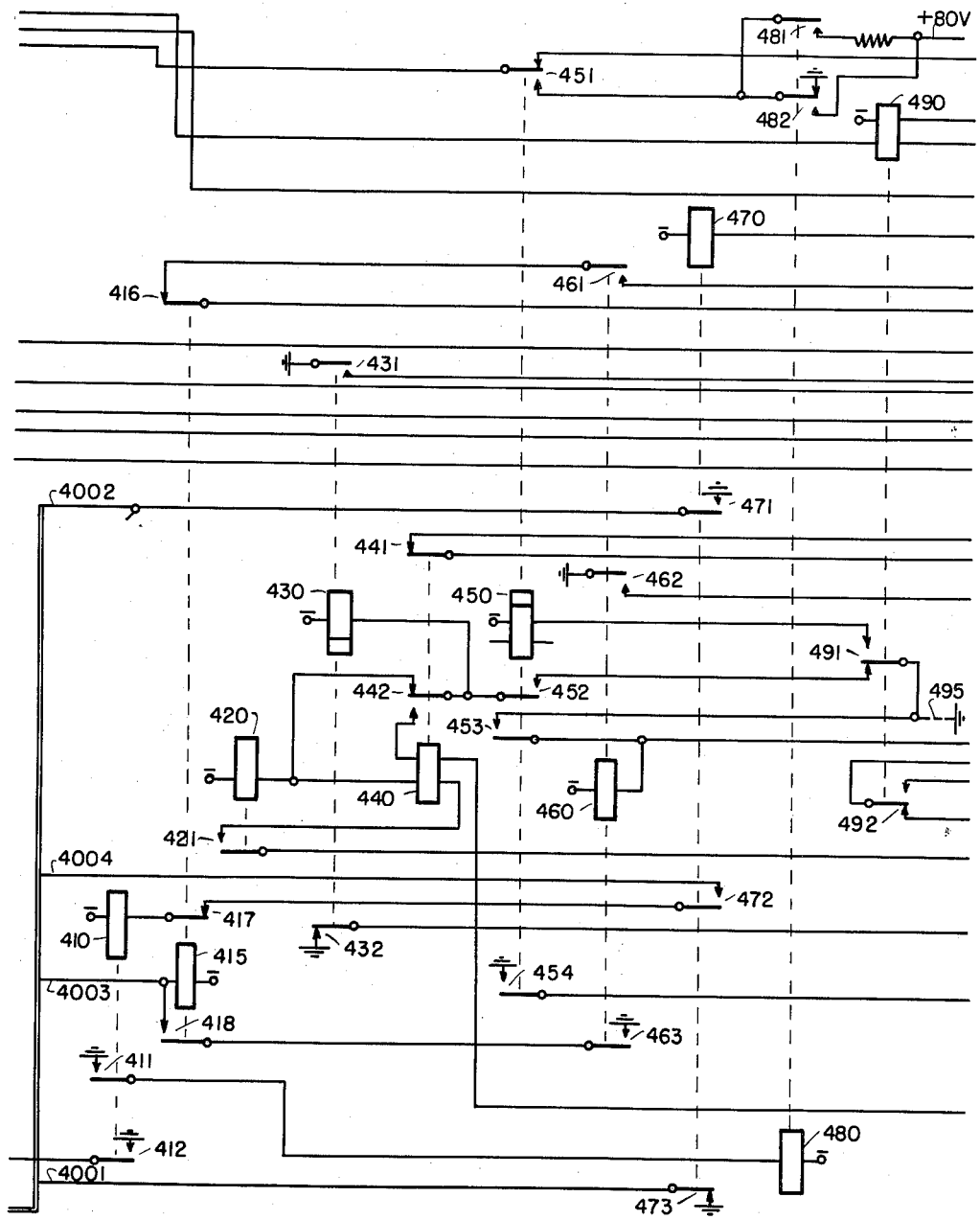
Figure 5:
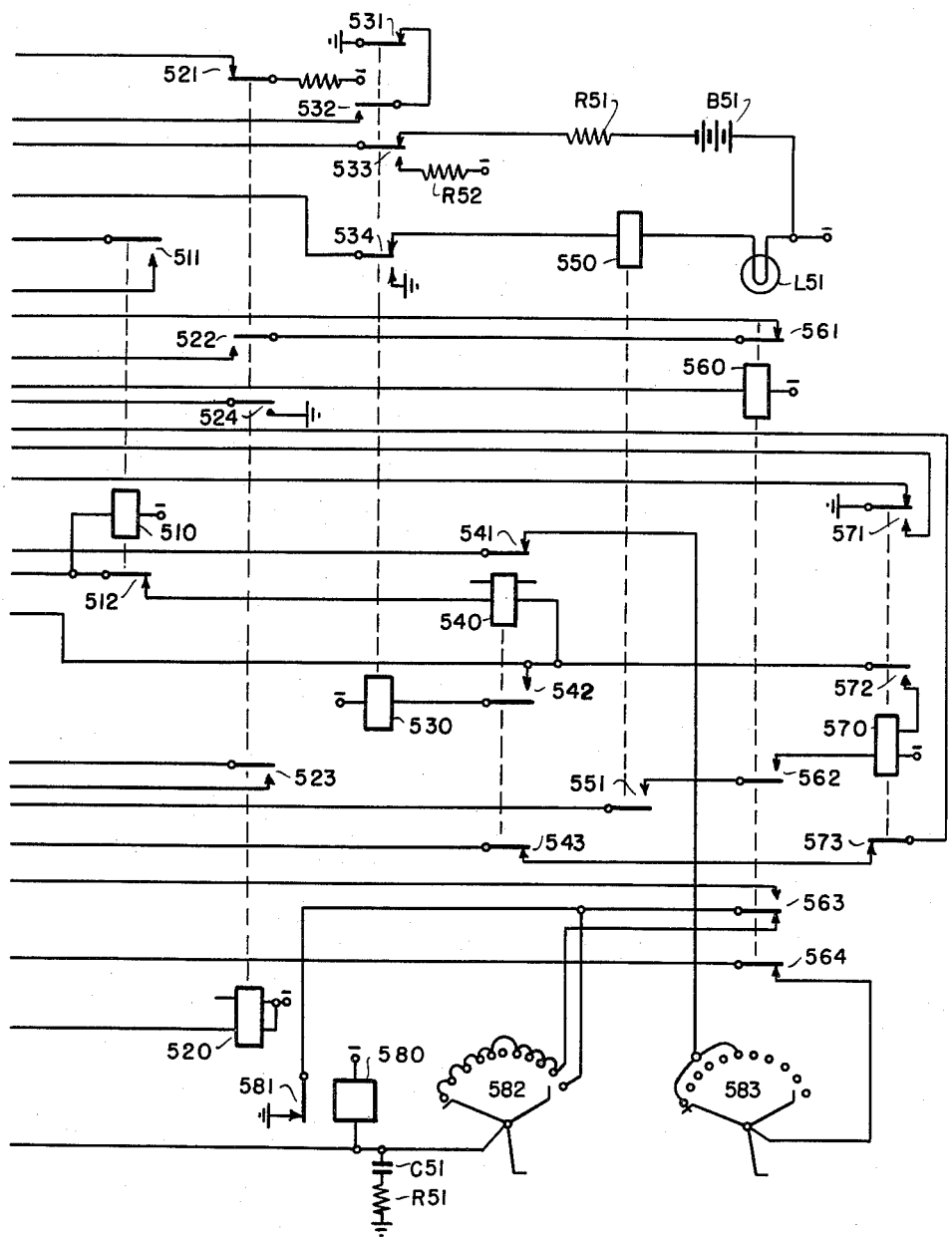

Referring now to FIGS. 4 and 5, negative potential from spotter battery B51 through resistor R51 is fed through the lower winding of relay 490, the "+" line conductor of cable 1000, through the selector 140, the finder 130, the line circuit 120 through line 122 to the subscriber's instrument and back over line 121 the line circuit, the finder, the selector, the "—" line of cable 1000 through break contacts 534, through the winding of polarized spotter relay 550 and lamp L151 completing a circuit to the positive terminal of spotter battery B51 and the negative terminal of the exchange battery. This current flow from the spotter battery B51 is in a direction which will not operate polarized relay 550, but will operate relay 490. Relay 490 operates and closes the make contacts of the break make combination 491 to complete a circuit from ground potential 495 which passes through other relay contacts not shown, to the number one winding of relay 450. Relay 450 operates and closes contacts 453 to complete a circuit to operate relay 460 to prepare other circuits, and at contacts 454 completes a circuit to relay 520. Relay 450 at contacts 451 also closes ground to the C lead of cable 1000 to hold the preceding equipment and mark this circuit busy.

*Dialling the Toll Access Code Digit "0"*

In response to the dialling of the second digit of the toll access code, which in this case is the digit "0," the local line relay 490 restores and operates ten times. The first time the line relay 490 restores to normal it completes, at its break contacts 492, a circuit from ground 495 including the make contacts 453, the make contacts 523, the break contacts 492, the break contacts 543 and the break contacts 573 for energizing the party marking switch rotary magnet 230. The magnet of switch 230 is retained in its operated position until the line relay 490 reoperates, at the end of the first pulse. At which time the magnet restores to normal and advances its wipers 231, 232 and 233 one step. Thus in response to the ten impulse transmitted to the line relay 490, the above traced circuit for the magnet of switch 230 is completed ten times. Also during the first time the line relay 490 restores to normal it completes at its break contacts 491, a circuit from ground 495 including the break contacts 491 and the make contacts 452 for operating relay 430, and through break contacts 442 for operating relay 420. Relay 430 completes a circuit to relay 560 which operates and closes a holding circuit to relay 420 through the number two winding of relay 440, contacts 421, make contacts 563 to ground at the interrupter springs of rotary switch 580.

At the end of the first dial pulse, as relay 490 reoperates and opens the circuit to relay 430 at contacts 491, it removes the short from winding number two of relay 440. Relay 440 operates in series with relay 420 and transfers the pulsing circuit through its number one winding to the magnet of rotary switch 580. Relay 430 being slow-to-release, remains operated during dialling of the digit.

When relay 490 restores on the second dial pulse, it closes the circuit to the magnet of rotary switch 580 through the number one winding of relay 440. The magnet of rotary switch 580 in operating opens its interrupter springs 581. The springs 581 open the circuit to relay 420, but relay 440 remains operated on its number one winding for the duration of the pulse.

At the end of the second dial pulse, as relay 490 reoperates, it opens the circuit to the magnet of rotary switch 580. Rotary switch 580 advances its wipers 582 and 583 one step. Relay 440 restores and at break contacts 442 transfers the pulsing circuit back to relay 420. This same sequence of operations for relays 420 and 440 and switch 580 is repeated for the remaining dial pulses, and switch 580 will advance its wipers following the second, fourth, sixth, eighth and tenth dial pulses.

After the tenth dial pulse, the wiper 582 and 583 of switch 580 are engaged on bank terminals 1 or 6, depending on the position of the switch at the start of dialling. It is to be noted that switch 580 is a homing switch, that is when a digit is completed and relay 560 restores, ground is closed via interrupter springs 581 and break contacts 563 to the bank terminals 2, 3, 4, 5, 7, 8, 9 and 10 of the level associated with wiper 582. If the wipers are engaged on any of these bank terminals, switch 580 will step to bank terminals one or six.

When digit "0" is completed, relay 430 restores, opens the circuit to relay 560, which is slow-to-release, and closes ground via contacts 432, 564 the wipers 583, contacts 541 and 441 to relay 510. Relay 510 operates and locks through the number two winding of 540 and contacts 462 to ground. When relay 560 restores it closes ground via contacts 524, 234, 522, 561, 416, 461 and 511 to relay 470. Relay 470 operates and closes ground to lead 4002 to the detector assigner relay 340, removes ground from the guard lead 400, and closes relay 410 to lead 4004 to the detector assigner. Relay 530 operates, momentarily closes the number two winding of relay 490 while transferring the "ring" or "—" side of the line from spotter battery B51 to exchange battery through resistor R52, and the "tip" or "+" side of the line from relay 550 to ground at contacts 534. Relay 490 is now held by exchange battery over the subscriber's loop.

*Identification of the Calling Party*

Type B SATT installations are capable of serving both single party lines and party lines with as many as ten stations. All stations on party lines must be equipped with special spotter dials, stations on single party lines are equipped with regular dials.

The spotter dial differs from the regular dial in that it provides an additional set of spotter springs which can be closed by a special cam. During the return of the dial, the spotter springs closed interval is positioned to occur only during the period when the regular pulsing springs are closed. The spotter springs when closed by the special cam close a spotter ground pulse on the tip or positive side of the line. The spotter cam can be arranged to close the spotter ground pulse on the line after any one of the individual dial pulses. For the first station, the spotter dials are adjusted to send a spotter pulse after the first dial pulse of the digit "0." For the second station, the spotter dials are adjusted to send a spotter pulse after the second dial pulse of the digit "0." The third, fourth, fifth, sixth, seventh, eighth, ninth and tenth stations on a party line are arranged accordingly. For purposes of this explanation it is assumed that the calling station is the fourth station on the party line thus no spotter pulse will be closed via the tip or plus side of the line until after the fourth dial pulse.

Now consider what happened to switch 230 as the digit "0" was being dialled in the preceding section. Switch 230 stepped to bank terminal 1 after the first dialled pulse. Then as relay 490 follows the second, third and fourth pulses the wipers of switch 230 are advanced to bank terminals 2, 3 and 4. Immediately after the fourth dial pulse the spotter dial of station PS–4 closes a spotter pulse from springs 42 via the tip or plus side of the line.

Relay 550 is a high speed polarized relay which will not operate from spotter battery over the normal dialling loop but will operate from exchange battery when a spotter ground pulse appears on the positive side of the line. Relay 550 operates during the interdigital pause between the fourth and fifth dial pulse and closes ground from terminal 495 to contacts 453, 523, make contacts 492, 551 and 562 to the number one winding of relay 570. Relay 570 operates and locks through its "X" contacts 572, opens the pulsing circuit to switch 230, at contacts 573 removes ground from lead PTO at break contacts 571, and closes ground at the make contacts 571 to the wipers 233 of switch 230 which are engaged on bank terminal four. When bar relay 200 operates later, this ground will be closed to lead 2004 to the detector to indicate the party identity of the calling station, further dial pulses do not effect switch 230. Wipers 231 and 232 of switch 230 serve no function on locally originated calls. If the calling station is a single party line no spotter pulses are closed to the positive line lead, switch 230 follows the 10 dial pulses of digit "0" and steps to bank terminal 10, since relays 550 and 570 do not operate ground remains on lead 2011 to indicate a single party line. Although the spotter pulses may appear on the tip side of the line during dialing of the subsequent digits, they are ineffective to relay 550 since the tip side of the line is transferred from relay 550 to ground after the "0" digit is completed.

When ground is placed on the common start lead 4002 by relay 470 of the ticketer, relay 340 of the detector assigner operates. Upon operating relay 340 closes magnet 360 to wiper 362, and closes relay 335 through magnet 360 to battery. If direct ground appears on the guard lead, such as lead 4001, to which the wiper 362 is connected, relay 335 is shorted and does not operate. Magnet 360 operates from the ground on these ground leads and opens its interrupter springs 361. Magnet 360 restores and advances its wipers to the next ticketer. This self-interrupted stepping continues until the ticketer circuit requiring detection is found.

When wiper 362 reaches the contact connected to lead 4001 relay 335 operates through magnet 360 and opens the circuit at contacts 336 to wiper 362, and extends the hold lead 4004 from wiper 363, through contacts 337 to relay 325. Relay 325 operates in series with relay 410 in the ticketer, locks to the hold lead through its "X" contacts 327 and closes the circuit to relay 315 at contacts 326. Relay 315 operates, closes the circuit to relay 320 at contacts 319, opens the circuit to relay 335 at contacts 318 and opens the circuit to relay 345. Relay 335 restores and opens the operating circuit to relay 325. Relay 320 operates, closes lead 3003 at contacts 322 and relay 330 at contacts 323 to lead 3004, and closes lead 001 to lead 3002.

When relay 315 operated, it opened normally operated relay 345. Relay 345, which is slow-to-release will restore with some delay, opening at contacts 346 the circuit to relay 350. Relay 350 which is also normally operated, is also slow-to-release. The restoration of 350 opens at contacts 351 the circuit to relay 355. By this time a normal detection cycle should have been completed and relay 315 restored thus permitting relays 345 and 350 to reoperate. If, however, detection has not been closed to the ticketer by this time and relay 355 restores, ground is closed over lead 3002 to the ticketer to mark an incomplete detection.

Initiating Detection Cycle

Ordinarily, the detection cycle is so rapid it will occur shortly after the digit "0" is completed. Ground on lead 4002 and absence of ground on lead 4001 indicates to the detector assigner that a detection of a calling number is desired by a ticketer. When the detector assigner steps to the ticketer, relay 410 operates over lead 4004 in series with relay 320. Relay 410 closes a circuit at contacts 412 for relay 200, and at contacts 411 a circuit for relay 400. Bar relay 200 operates and closes leads W1 through Z5, P1 through P0, and 4003 to the detector and leads 3002 and 3004 to the detector assigner. Relay 480 operates and closes positive 80 volts D.C. detection battery to the preceding equipment via the "C" conductor.

Operation of Detector

When the detector is connected to the ticketer there is a ground potential on lead 3003, positive 80 volt D.C. battery on the "C" conductor of the calling line and a ground potential on some party 0 through party 10 lead such as 2001 through 2011 to the party marking relays 900' through 990, depending on the station party marking of the calling party as determined by the ticketer.

Relay 1080 operates, closes ground over lead 1085 to the detector relays, such as slave relay 1120 of the "0" thousands character detecting circuit 1101, in each of the thousands character detecting circuits 1161 through 1160, closes negative battery over lead 1086 to the slove relays, such as relay 720 of the "0" tens character detecting circuit 761, in each of the tens character detecting circuits 761 through 760, prepares a path to relay 1090 at contacts 1083, and prepares a holding circuit to relays 1000 and 1010. One of the party "0" through party "10" marking relays 900' through 990 operates and prepares a firing path for the neon lamps strapped to the corresponding party marking lead.

If the calling line is an individual line, the positive 80 volt D.C. battery appears on only one "C" lead and thus on only one neon lamp. If a party line, the positive 80 volt D.C. battery appears on all the "C" leads associated with the common line equipment and thus appears on each of the corresponding neon lamps. However only the neon lamp which is strapped to the party marking corresponding to the calling party will have a complete path, enabling it to fire.

Detection Cycle

We have previously assumed that the calling party's office digit code and terminal number is 10004 and that it is station #4 on a party line in the first 10,000 terminal group. The calling party's associated detrel relay would be relay 640 in the "00" thousands and hundreds access group and would be strapped to party marking lead 642.

Relay 930 for marking the fourth path operates from ground on lead 2004 extended by the ticketer relay 200. Upon operating relay 230 closes a circuit from negative battery, relay 1050, contact 931, through the strapping field of FIG. 10 to lead 642, relay 640, neon tube 643 to the "C" conductor 123 of line equipment circuit 120 and to positive 80 volt D.C. potential at contacts 481 and 482 of the ticketer. The neon lamp 643 fires under the high voltage and provides an operating path for detrel relay 640 and relay 1050. Relay 1050 operates and closes the number one winding of relay 1060. Relay 1060 operates and locks through its number two winding, contacts 1063 to ground at contacts 1084, short circuits relay 1050 and closes ground from contacts 1061 and 1062 on the WXYZ1 lead to the ticketer to mark the calling party in the first 10,000 terminal group. Relay 1050 restores and opens the operating path to 1060.

Relay 640 operates and closes lead 00 of the vertical thousands and hundreds conductors at contacts 641 to lead 04 of the horizontal tens and units conductors. Relay 1110 of the thousands relays and relay 710 of the tens relays operate in series through their number one windings from battery, relay 1110, resistor 1141 vertical conductor 00, contacts 641, resistor 745, relay 710 to ground. In the thousands group, relay 1110 closes a circuit to its slave relay 1120 at contacts 1111. Relay 1120 operates through the number two winding of relay 1110 and closes contacts 1121 through 1130 to relay 1201 through 1291 respectively. In the tens group 761, relay 710 closes a circuit to its slave relay 720 at contacts 711. Relay 720 operates through the number two winding of relay 710 and closes contacts 721 through 730 to relays 800 through 890 respectively.

Relay 1200 of the hundreds digit detector relays, and relay 840 of the units digit detector relays operate in series through their number two windings, lock through their number one windings and close leads 1088 to 1087. The circuit being from ground through the number one winding of relay 840, contacts 841, lead 1087, contacts 1083, relay 1090, lead 1088, contacts 1201, number one winding of relay 1200 to battery. Relay 1090 operates in series with relays 840 and 1200 and closes ground over lead 2001 to the ticketer to indicate completion of the detection cycle.

Marking

Different combinations of ground on the W, X, Y, Z leads identify the digits of the calling terminal. Relays 1066 and 1070 indicate the office code digit of the first and second 10,000 terminal group on the W1, X1, Y1, Z1 leads. Relays such as 1110 in groups 1161 through 1160, and relays 200 through 1290 indicate the thousands and hundreds digit on the W2, X2, Y2, Z2 and W3, X3, Y3, Z3 leads respectively. Similarly, relays such as 710 in groups 761 through 760, and relays 800 through 890 indicate the tens and units digits on the W4, X4, Y4, Z4 and W5, X5, Y5, Z5 leads. The different combinations of ground on the W, X, Y, Z leads and their decimal equivalents are as follows:

| Grounded WXYZ marking conductor | Operated WXYZ relay register | Digit registered |
|---|---|---|
| WX | WX | 1 |
| WY | WY | 2 |
| WZ | WZ | 3 |
| XY | XY | 4 |
| XZ | XZ | 5 |
| YZ | YZ | 6 |
| W | W | 7 |
| X | X | 8 |
| Y | Y | 9 |
| Z | Z | 0 |

The grounds extended over the five groups of W, X, Y, Z, leads to the ticketer operate codel relays such as shown in codel group one of FIG. 2, which lock to record the office code digit and terminal number of the calling party.

*Double Detection*

When the detector relays of FIGS. 7, 8, 11 and 12 operate, relays 1000, 1010, 1020 and 1030 are closed to leads 806, 700, 1206 and 1100 respectively. These leads are each closed to ground through a 2300 ohm resistor. The path for relay 1000 which is typical for the four relays is battery through relay 1000, lead 806, contacts 842, resistor 845 to ground. Relay 1000 also relays 1010, 1020 and 1030 do not operate over this path. However, if more than one detector relay for the same digit is operated, a multiple 2300 ohm resistance path to ground is closed to either relay 1000, 1010, 1020 or 1030. The relay 1000, 1010, 1020 or 1030 relay operate over the multiple path and close ground over lead 3001 to the detector assigner to mark a double detection and sends an incomplete detection mark to the ticketer.

*Release of Detector*

In the course of the detection cycle, the detector closes ground to the W1 through Z5 leads. These grounds represent, in codel code, the equivalent office code and terminal number of the calling station. Codel relays in codes 1 through 5 operate from these grounds and lock to store the calling number.

When the detection is complete, the detector closes ground from relay 1090 at contacts 1091, to lead 2001, contacts 226, lead 4003 to relay 415. Relay 415 operates and locks through contacts 418 and 471 to ground, opens relay 470 at contacts 416 and opens relay 410 at contacts 417. Relay 470 restores, removes ground from lead 4002 and closes ground to lead 4001. Relay 410 restores and replaces positive 80 volt D.C. detector battery with ground on the "C" lead to the preceding switching equipment.

The releasing action of the ticketer with regards to the detector is the same when a detection cycle has been completed or an incomplete detection has occurred, the positive 80 volt D.C. battery is removed from the "C" lead and leads 3003, 2004 and 3001 are opened. Relay 640 restores and opens the number one windings of the detector relays 710 and 1110 and the number two windings of detector relays 840 and 1200. Relays 710 and 1110 remain operated through their number two windings in series with their slave relays 720 and 1120 respectively which also remain operated over this path. Detection relays 840 and 1200 remain operated through their number one windings in series with relay 1090. When relay 200 restores it opens the circuit to relay 930 and removes ground from lead 3004 to the detector assigner. In the detector assigner, relay 340 and relay 325 restored when relay 470 restored, to open the circuits to relays 335 and 315 respectively. Relay 315 at contacts 319 releases relay 320 which opens the circuit to lead 3003 to release relay 1080 of the detector. Relay 1080 restores and opens relays 1090, 840 an 1200 at contacts 1083 and at contacts 1081 and 1082 opens relays 710 and 720 and relays 1110 and 1120 respectively. The relay 1060 circuit is opened at contacts 1084. The detector circuit is now ready for reassignment to another ticketer requiring a calling line number detection.

The remaining operations involving the above toll call are identical to those described in the copending application of John E. Ostline, I. V. Coleman and J. W. Taugner.

While one embodiment of the invention has been disclosed and described, it will be understood that various modifications may be made therein which are within the true spirit and scope of the invention.

What is claimed is:

1. An identifier for a telephone system comprising a plurality of marking conductors each individual to a subscriber line to be identified and having a plural digit designation, a plurality of gas filled two element tubes individual to each marking conductor, one element of each of said tubes connected to its associated marking conductor, a plurality of relays, one of said relays individual to each tube and individually connected to the other element of each of said tubes, means operated in response to a call on a given one of said lines for completing a circuit including the marking conductor individually corresponding to said calling line and the associated tube and relay in order to fire said tube to operate said relay, a coordinate grid pattern including first and second groups of registers respectively connected to the abscissa and ordinate rows of said grid, contacts controlled by said operated relay for completing a circuit between a particular abscissa and ordinate of said grid pattern to selectively operate one of said first group registers and one of said second group registers, said operated register in said first group register identifying certain digits of said plural digit designation and said operated register in said second group register identifying the remaining digits in said plural digit designation of the marking conductor individual to said calling line.

2. A line identification circuit for a telephone subscriber line identified by a multi-digit designation, comprising a single gas filled electronic device and a relay individual to said line, two electrodes in said device, a pair of make contacts on said relay, line equipment for said line having a marking conductor, one of said electrodes connected to said marking conductor, means including a plural digit register controlled over said line in response to a call extended thereover for connecting said line to said register and for impressing a potential on said conductor to prepare a circuit for rendering said gas filled device conductive, said plural digit register also controlled in response to said call on said line for completing a circuit to said gas filled device to thereby cause the operation of said relay, and means operated responsive to the operation of said relay for operating said register to register the digits of the multi-digit designation of said calling line.

3. In a telephone system including a group of lines, each of said lines having a multi-digit identifying number individual thereto, a single identifying conductor individual to each of said lines, a single two element gas filled discharge device and a relay with a pair of make contacts individual to each of said identifying conductors, a coordinate grid of ordinate and abscissa conductors, marking relays connected to said ordinate and abscissa leads, each of said make contacts of said relay effective to complete a coordinate cross point between one of said ordinate and one of said abscissa conductors, means responsive to a call from any one of said lines for impressing a marking potential on the identifying conductor individual to said line for rendering the associated device conducting to thereby operate the associated relay, the contacts of said operated relay effective to complete a coordinate cross point connection through said coordinate grid to the marking relays corresponding to the directory number of the calling line.

4. In a telephone system including a group of lines, each of said lines having a multi-digit identifying number individual thereto, a single identifying conductor individual to each of said lines, a single gas filled two element discharge device and a relay with a pair of make contacts individual to each of said identifying conductors, a coordinate grid having 100 by 100 leads, marking relays each connected to a plurality of said grid leads, each of said make contacts effective to complete a connection between certain of said coordinate grid leads, means responsive to a call from any one of said lines for impressing a potential on the identifying conductor individual to said line for rendering the associated device conducting to thereby operate the associated relay, the contacts of said operated relay effective responsive to the operation of said relay for completing a circuit through said grid to the marking relays corresponding to the directory number of the calling line.

5. An identification system for obtaining the numerical designation of a cross point connection in a coordinate grid, which grid is composed of a plurality of ordinate conductors and a plurality of abscissa conductors and having means for completing a connection between one of said ordinate with one of said abscissa conductors, comprising a first group of circuits, each circuit connected to a number of ordinate conductors having a common designation, and a second group of circuits, each said circuit of said second group connected to a number of said first circuits, one of said first circuits operated when any one of said number of ordinate conductors connected to it is involved in a cross point connection in said grid to thereby identify said connected conductor by its common designation and to extend said connected conductor to said second circuit, said second circuit identifying said conductor's position in said first circuit, and a third group of circuits, each circuit connected to a number of abscissa conductors and a fourth group of circuits, each said fourth circuit connected to a number of said third circuits, one of said third circuits operated when any one of said number of abscissa conductors connected to it is involved in a cross point connection in said grid to thereby identify said connected abscissa conductor by its common group designation and to extend said conductor to said fourth relay circuit, said fourth relay circuit identifying said conductors position in said third relay circuit.

6. An identification system for obtaining the numerical designation of a cross point connection in a coordinate grid, which grid is composed of a plurality of ordinate conductors and a plurality of abscissa conductors, and having means for completing a connection between one of said ordinate with one of said abscissa conductors, comprising a first group of circuits, each circuit connected to ten ordinate conductors having a common designation, and a second group of circuits, each said circuit of said second group connected to ten of said first circuits, one of said first circuits operated when any one of said ten ordinate conductors connected to it is involved in a cross point connection in said grid to thereby identify said connected conductor by its common designation and to extend said connected conductor to said second circuit, said second circuit identifying said conductors position in said first circuit, and a third group of circuits, each circuit of said third group connected to ten abscissa conductors, a fourth group of circuits, each said circuit of said fourth group connected to ten of said third circuits, one of said third circuits operated when any one of said ten abscissa conductors connected to it is involved in a cross point connection in said grid to thereby identify said connected abscissa conductor by its common group designation and to extend said conductor to said fourth relay circuit, said fourth relay circuit identifying said conductor's position in said third relay circuit.

7. An identification system for obtaining the numerical designation of a connection at an intersecting point in a grid, which grid is composed of a first one hundred conductors numbered 00 to 99 crossed by a second one hundred conductors numbered 00 to 99 in which there is means for connecting one of said first conductors to one of said second conductors at an intersecting point, comprising a first group of ten relay circuits with each circuit connected to ten of said first one hundred conductors having a common designation, one circuit of said first group of ten relay circuits completed when any one of said ten conductors connected to it is involved in a connection in said grid to thereby identify said connected conductor by its common designation and to extend said connected conductor to a second relay circuit, said second relay circuit identifying said conductors position in said one of said first group of ten relay circuits, and a group of ten third relay circuits with each circuit connected to ten of said second one hundred conductors, one circuit of said third group of ten relay circuits completed when any one of said ten of said second 100 conductors connected to it is involved in a connection in said grid to thereby identify said last connected conductor by said one of said third group of ten relay circuits designation and to extend said conductor to a fourth relay circuit, said fourth relay circuit identifying said conductors position in said third relay circuits group.

8. A substation identification circuit for a telephone subscriber substation identified by a multi-digit designation, comprising a single gas filled electronic device and relay individual to said substation, and a grid and marking circuit, said device having only two electrodes, said relay having only a pair of make contacts, line equipment for said substation having a marking conductor, one of said electrodes connected to said marking conductors, a plural digit register and control means, said control means controlled over said line responsive to a call initiated thereover for marking said line to said register and control means for impressing a potential on said conductor to prepare a circuit for rendering said gas filled device conductive, said plural digit register and control means responsive to the dialling of a digit "0" on said line for completing said circuit to said gas filled device to thereby cause the operation of said relay, and means operated responsive to the operation of said relay for making a connection at an intersecting point in a grid, which grid is composed of a first one hundred conductors numbered 00 to 99 crossed by a second one hundred conductors numbered 00 to 99 in which said relay individual to said substation comprises the means for connecting one of said first conductors to one of said second conductors and intersecting point including a first ten relay marking circuits with each circuit connected to ten of said first one hundred conductors having a common designation, one of said first ten relay circuits completed when any one of said ten conductors connected to it is involved in a connection in said grid to thereby mark said connected conductor by its common designation and to extend said conductor to a second relay marking circuit said second relay circuit marking said conductors position in said one of said first ten conductor groups, and ten third relay marking circuits with each circuit connected to ten of said second one hundred conductors, one of said third relay circuits completed when any one of said ten of said second one hundred conductors connected to it is involved in a connection in said grid to thereby identify said last connected conductor by said one of said third ten relay circuits designation and to extend said conductor to a fourth relay marking circuit, said fourth relay circuit marking said conductors position in said third relay circuits group.

References Cited in the file of this patent
UNITED STATES PATENTS

| | | |
|---|---|---|
| 2,297,365 | Ostline | Sept. 29, 1942 |
| 2,672,515 | Barlow | Mar. 15, 1954 |
| 2,672,518 | Holden | Mar. 16, 1954 |
| 2,857,470 | Faulkner | Oct. 21, 1958 |